Figure 1:
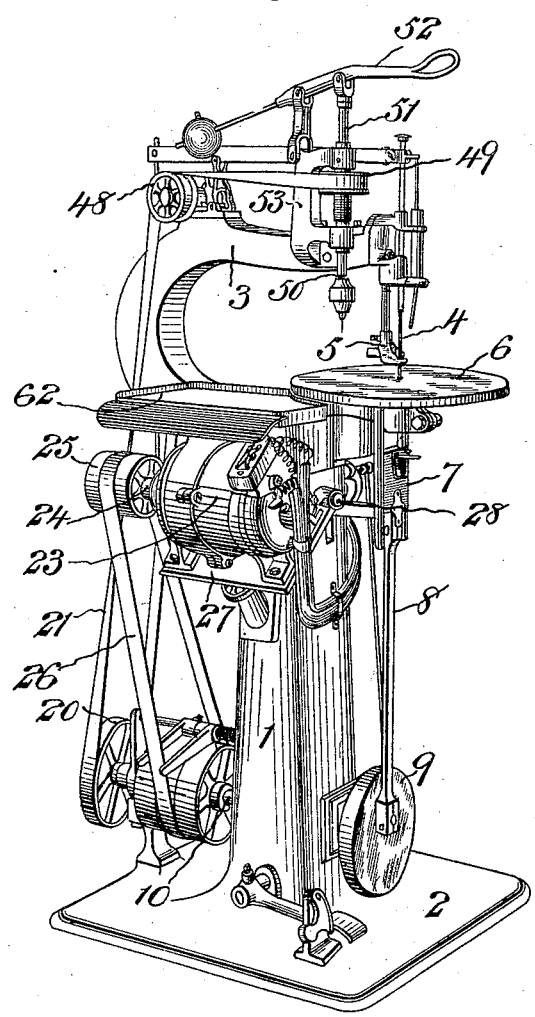

No. 855,814. PATENTED JUNE 4, 1907.
V. E. ROYLE.
COMBINED JIG SAW AND DRILL.
APPLICATION FILED AUG. 6, 1904.

3 SHEETS—SHEET 1.

Witnesses:-
F. George Barry
Henry Thieme

Inventor-
Vernon E. Royle
by attorneys

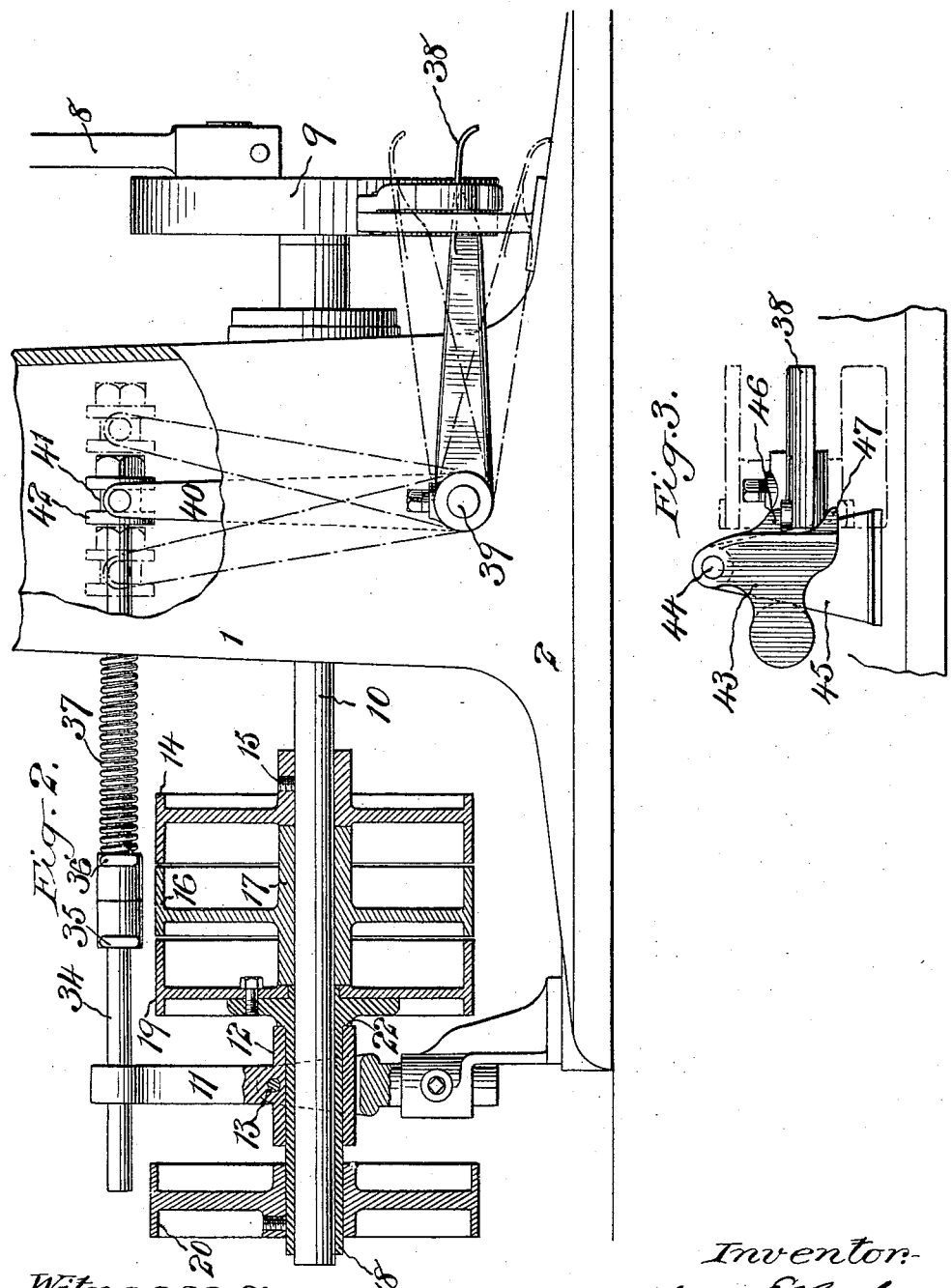

No. 855,814. PATENTED JUNE 4, 1907.
V. E. ROYLE.
COMBINED JIG SAW AND DRILL.
APPLICATION FILED AUG. 6, 1904.
3 SHEETS—SHEET 3.
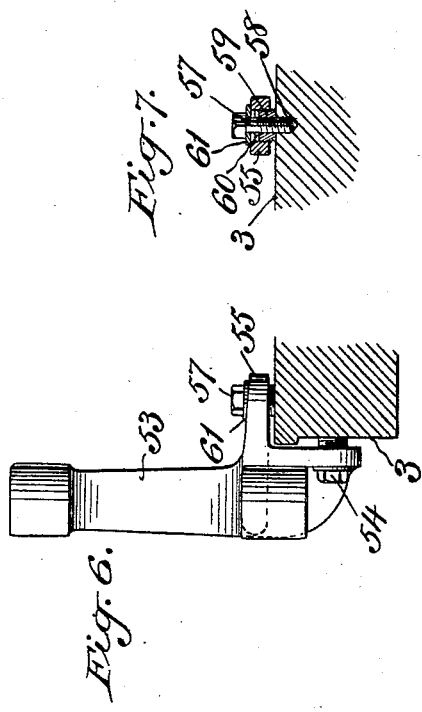
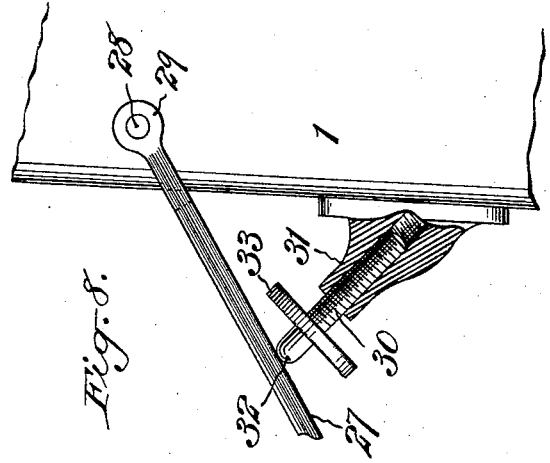
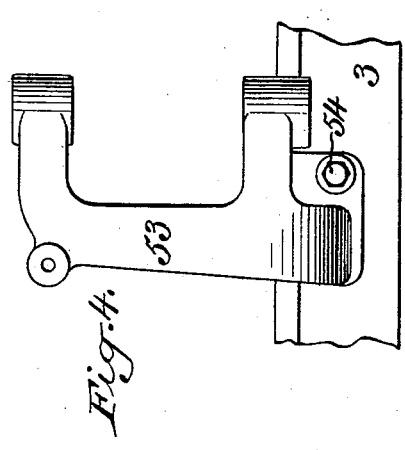
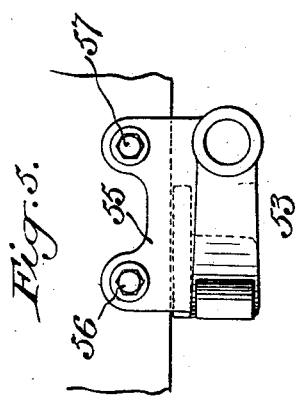
Witnesses:-
F. George Barry,
Henry Thieme
Inventor:-
Vernon E. Royle
by attorneys
Brown & Seward
THE NORRIS PETERS CO., WASHINGTON, D. C.

UNITED STATES PATENT OFFICE.

VERNON E. ROYLE, OF PATERSON, NEW JERSEY.

COMBINED JIG-SAW AND DRILL.

No. 855,814.        Specification of Letters Patent.        Patented June 4, 1907.

Application filed August 6, 1904. Serial No. 219,769.

*To all whom it may concern:*

Be it known that I, VERNON E. ROYLE, a citizen of the United States, and a resident of Paterson, in the county of Passaic and State of New Jersey, have invented a new and useful Combined Jig-Saw and Drill, of which the following is a specification.

My invention relates to a combined jig saw and drill and more particularly to the arrangement of the drill and its driving mechanism with respect to the frame of the jig saw whereby the additional advantage of a drill is obtained without, to any great extent, increasing the space required for setting up the jig saw and whereby the jig saw frame may be utilized to a very considerable extent as a support for the drill and its driving mechanism.

In the accompanying drawings, Figure 1 is a view of the combined jig saw and drill in perspective, Fig. 2 is an enlarged vertical section partly in elevation through the base of the machine, and the parts in proximity thereto, Fig. 3 is a view in front elevation showing the foot pedal and the means for locking it in its various adjustments, Fig. 4 is an enlarged view in detail in elevation of the drill spindle frame and a part of the jig saw frame to which it is attached, Fig. 5 is a front top plan view of the same, Fig. 6 is a view of the same in front elevation showing the jig saw frame in section, Fig. 7 is a view in detail showing the manner of adjusting the drill frame with respect to the jig saw frame, and Fig. 8 is an enlarged view in detail showing the means for adjusting the electric motor bodily through space for tightening the driving belt.

The pedestal which supports the several running parts and which is, in fact, the pedestal of the jig saw, is denoted by 1 and terminates at the bottom in an extended base 2 by means of which it is supported in stable adjustment in such position as may be desired.

The top of the pedestal is provided with a curved supporting arm 3 which first recedes from the top of the pedestal 1 and then returns over the top of the pedestal somewhat after the manner of the letter G.

In its free end the jig saw 4 is mounted as is usual and reciprocates through a guide 5 depending from the free end of the overhanging arm 3 to operate upon work which may be placed upon a table 6, the jig saw being driven by means of a vertically sliding head 7 connected by a pitman 8 with a crank wheel 9 on the front end of a drive shaft 10 mounted in the pedestal 1 near its base. The shaft 10 is also supported in a standard or bracket 11 by means of a rocking bearing sleeve 12 suspended by a pin 13 in the support 11.

On the shaft 10 there is fixed a drive pulley 14 for rotating the shaft 10 and hence the crank wheel 9 and the jig saw, the wheel 14 being clamped to the shaft by means of a suitable set screw 15 extending through its hub into engagement with the shaft. There is also loosely mounted on the shaft 10 a pulley 16 having its hub 17 extended along the shaft 10 in opposite directions from the plane of the face of the wheel to give it an extended bearing with the shaft as it forms the idler or loose pulley to receive the belt in the event the motor is continuously driven when neither the jig saw or drill are in operation. There is also loosely mounted on the shaft 10 a sleeve 18 which extends through the overhanging bearing 12 and which, while itself mounted directly within the overhanging bearing 12, at the same time forms the immediate bearing of the shaft 10 extending therethrough.

On the sleeve 18 there is fixed a drive pulley 19 for operating the drill and also a pulley 20 for transmitting the rotary movement of the pulley 19 and sleeve 18 to the drill by means of a transmitting drive belt 21 (see Fig. 1). The sleeve 18 is provided with an annular shoulder 22 which bears against the inner end of the bearing 12 and so prevents the said sleeve 18 from an unintentional outwardly sliding movement along the shaft 10 while the said sleeve so locked against longitudinal displacement on the shaft also serves to locate the hub 17 of the loose pulley intermediate of the sleeve 18 and the hub of the saw driving pulley 14 on the shaft 10.

In the present instance I have shown the machine as driven by an electric motor and this motor is denoted as a whole by 23 and may be of any well known or approved form. This motor has its shaft 24 provided with a pulley 25 by means of which motion is imparted to the several pulleys on the drive shaft 10 through a belt 26 engaged with the pulley 25 and adapted to be shifted to any one of the three pulleys 14, 16, 19, as may be desired and in a manner which will hereinafter be particularly explained.

The motor 23 is mounted on a table 27 hinged at its inner end to the pedestal 1 by means of a rod 28 (see Figs. 1 and 8) extending through the pedestal and through ears 29 on the table 27, it being understood that there is an ear similar to the ear 29 shown in Figs. 1 and 8 on the opposite side of the pedestal for receiving the rod 28.

The table 27 which supports the motor 23 may be swung with the motor thereon in a direction away from the shaft 10 to tighten the belt. Provision for this is made by locating a screw 30 in a screw threaded boss 31 fixed to the pedestal 1, the rounded head 32 of the screw being engaged with the under side of the table and a screw operating wheel 33 being fixed to the screw so that it may be easily manipulated to screw it in or out to lower or lift the table 27. It is to be understood that the motor 23 is provided with suitable electric connections by means of which it may be connected with a source of electric energy.

The belt 26 leading from the pulley on the motor shaft to the pulleys on the shaft 10 is shifted to drive either the saw or drill or needle as follows: A rod 34 is mounted to slide longitudinally in the pedestal 1 and in the top of the bracket 11. On this rod are fixed a pair of arms 35, 36, for embracing the opposite edges of the belt 26 and a coil spring 37 is interposed between the arm 36 and the face of the pedestal 1, the tension of which is exerted to throw the rod 34 to its outward limit with the arms 35, 36, in position to locate the belt 26 on the pulley 19. The said arms 35, 36, with the belt between them, are drawn against the tension of the spring to locate the said belt 26 either on the loose pulley 16 or on the saw driving pulley 14 by means of a foot pedal 38 fixed to a rock shaft 39 mounted in the base of the pedestal 1 and provided with an uprising arm 40 engaging at its free end an annular groove 41 in a collar 42 fixed on the end of the rod 34.

The pedal 38 is locked against the tension of the spring 37 in either its partially or fully depressed positions by means of a gravity dog 43 suspended from a pin 44 on the top of a bracket 45 uprising from the base 2. The dog 43 has a nose 46, intermediate of its support and its lower end, under which the pedal 38 may catch when it is desired to hold the belt on the loose pulley 16, and has a nose 47 at its lower end under which the pedal may catch when it is desired to hold the belt on the pulley 14 for driving the saw.

The drive belt 21 which leads from the pulley 20 to the drill, straddles the curved arm 3, one part of said belt being located on one side of the arm and another part of the other side of the arm thereby materially economizing space and centering the strain of the belt with respect to the arm 3. After extending to a point immediately above the top of the arm 3, the said belt 21 is guided by means of guide pulleys 48, it being understood that there is a pulley similar to the pulley 48 shown on Fig. 1, symmetrically arranged with respect to the guide pulley 48 and on the opposite side of the arm, the said belt extending from the guide pulleys 48 forwardly to the fixed pulley 49 on the drill spindle 50.

The drill spindle 50 is mounted in any well known or approved form in a vertically movable tubular holder 51 connected with a counterbalanced lever 52 for moving it toward and away from its work.

My present invention does not relate to the specific structure of the drill and the means for moving it toward and away from its work but only to the means for supporting the drill and its holder with relation to the overhanging arm 3 of the jig saw. This means of support consists of a G-shaped frame 53, in the free ends of the branches of which the drill and its holder are mounted, the said frame 53 being attached to the side and top of the overhanging arm 3 as follows:— Through that part of the frame 53 which is adjacent to the side of the arm 3 there extends a bolt 54 for holding the frame 53 securely in position so far as its movement toward and away from the side of the arm 3 is concerned while that part 55 of the base of the frame 53 which overlaps the top of the arm 3 is provided with screws 56 and 57 extending through the flange 55 and engaging threads 58 tapped into the top of the arm 3 as shown in Fig. 7.

The screws 57 are of less diameter than the holes through the base flange 55 of the frame 53 and said holes are provided with interior screw threads with which are engaged short screws 59 bearing at their inner ends against the top of the arm 3. These short screws 59 have kerfs 60 for operating them by inserting a screw driver into the perforation in the base 55 when the screw 57 is removed but do not extend above the top of the flange 55.

Washers 61 are inserted between the heads of the screws 57 and the top surface of the flange 55 so that the head of the screw 57 may, through the medium of the washer 61, press against the top of the flange 55 to hold it firmly to the arm 3.

By adjusting the short screw 59 slightly inwardly or outwardly, the frame 53 may be tilted either bodily sidewise or edgewise to give it the proper position with respect to the arm 3 so as to hold the drill spindle in a perfectly upright position and this may be accomplished without requiring any planing of the arm 3 and so provides for attaching this drill frame to the jig saw frames already in common use and setting it up in such form as to cause the drill to run accurately without requiring any expensive manipulation or fitting of the overhanging supporting arm of the jig saw.

A tool tray 62 is located in proximity to the table 6 within convenient reach of the operator at the top of the pedestal 1 and extends out over the motor 23 forming, at the same time, an effective dust guard for the motor and a convenient support for retaining the tools, for example, drills of various sizes, where they can be readily selected when desired.

What I claim is:—

1. The combination with the pedestal, the motor supported thereon, a saw frame, a drill frame supported on the saw frame and driving mechanism leading from the motor to the drill, of a combined tool tray and dust guard supported on the pedestal intermediate of the motor and drill.

2. The combination with the pedestal and the G-shaped arm, superposed thereon, for supporting the jig saw, of the G-shaped supplemental frame superposed on the said arm for holding the drill spindle in position.

3. The combination with the pedestal and the G-shaped arm for supporting the jig saw, of the G-shaped supplemental frame superposed on the said arm and means for adjusting the said supplemental frame comprising a short screw having a screw threaded engagement with a hole in the base of the frame and a binding screw extending through the short screw and engaged with the said arm.

In testimony, that I claim the foregoing as my invention, I have signed my name in presence of two witnesses, this 12th day of July 1904.

VERNON E. ROYLE.

Witnesses:
  FREDK. HAYNES,
  C. L. LUNDGREN.